(12) United States Patent
Truong (10) Patent No.: US 9,371,758 B2
(45) Date of Patent: Jun. 21, 2016

(54) DELIVERY DEVICE WITH PROTECTION AGAINST FREEZING, METHODS FOR OPERATING AND DEACTIVATING A DELIVERY DEVICE AND MOTOR VEHICLE

(71) Applicant: EMITEC GESELLSCHAFT FUER EMISSIONSTECHNOLOGIE MBH, Lohmar (DE)

(72) Inventor: Anthony Truong, Metz (FR)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 14/257,164

(22) Filed: Apr. 21, 2014

(65) Prior Publication Data

US 2014/0223888 A1 Aug. 14, 2014

Related U.S. Application Data

(63) Continuation of application No. PCT/EP2012/069379, filed on Oct. 1, 2012.

(30) Foreign Application Priority Data

Oct. 19, 2011 (DE) .................... 10 2011 116 335

(51) Int. Cl.
*F01N 3/00* (2006.01)
*F01N 3/18* (2006.01)
*F01N 3/20* (2006.01)

(52) U.S. Cl.
CPC *F01N 3/18* (2013.01); *F01N 3/208* (2013.01); *F01N 2610/02* (2013.01);

(Continued)

(58) Field of Classification Search
CPC ....... F01N 3/208; F01N 3/18; F01N 2610/02; F01N 2610/085; F01N 2610/148; F01N 2610/1486
USPC .......................................... 60/286
See application file for complete search history.

(56) References Cited

U.S. PATENT DOCUMENTS

| 8,398,924 B2 | 3/2013 | Hodgson et al. | |
| 2004/0177606 A1* | 9/2004 | Scharsack | 60/286 |

(Continued)

FOREIGN PATENT DOCUMENTS

| DE | 102004006333 A1 | 9/2005 |
| DE | 10362140 B4 | 4/2008 |

(Continued)

OTHER PUBLICATIONS

English Translation of German Patent Application Publication No. DE 102004006333 A1 (Sep. 2005).*

*Primary Examiner* — Jason Shanske
(74) *Attorney, Agent, or Firm* — Laurence A. Greenberg; Werner H. Stemer; Ralph E. Locher (57) ABSTRACT

A delivery device for delivering reducing agent into an exhaust-gas treatment device includes at least one delivery duct with at least one flexible wall region. The flexible wall region can deform when reducing agent in the delivery duct freezes. The flexible wall region separates the delivery duct from a compressed-air chamber which is connected to a compressed-air source. Methods for operating and deactivating a delivery device and a motor vehicle having a delivery device are also provided.

10 Claims, 3 Drawing Sheets

(52) U.S. Cl.
CPC ...... *F01N 2610/085* (2013.01); *F01N 2610/14* (2013.01); *F01N 2610/148* (2013.01); *F01N 2610/1486* (2013.01); *Y02T 10/24* (2013.01); *Y10T 137/0318* (2015.04); *Y10T 137/87571* (2015.04)

(56) References Cited

U.S. PATENT DOCUMENTS

| | | |
|---|---|---|
| 2010/0115932 A1 | 5/2010 | Kassel et al. |
| 2011/0113765 A1 | 5/2011 | Brück et al. |
| 2012/0174565 A1 | 7/2012 | Hodgson et al. |

FOREIGN PATENT DOCUMENTS

| | | |
|---|---|---|
| DE | 102007026892 A1 | 12/2008 |
| DE | 102008022991 A1 | 11/2009 |
| DE | 102008036265 A1 | 2/2010 |
| DE | 102008044708 A1 | 3/2010 |
| DE | 102009005790 A1 | 7/2010 |
| DE | 102009039735 A1 | 3/2011 |
| WO | 2008151908 A1 | 12/2008 |

* cited by examiner

DELIVERY DEVICE WITH PROTECTION AGAINST FREEZING, METHODS FOR OPERATING AND DEACTIVATING A DELIVERY DEVICE AND MOTOR VEHICLE

CROSS-REFERENCE TO RELATED APPLICATION

This is a continuation, under 35 U.S.C. §120, of copending International Application No. PCT/EP2012/069379, filed Oct. 1, 2012, which designated the United States; this application also claims the priority, under 35 U.S.C. §119, of German Patent Application DE 10 2011 116 335.6, filed Oct. 19, 2011; the prior applications are herewith incorporated by reference in their entirety.

BACKGROUND OF THE INVENTION

1. Field of the Invention

The invention relates to a delivery device with protection against freezing for delivering reducing agent into an exhaust-gas treatment device. The invention also relates to methods for operating and deactivating a delivery device and a motor vehicle having a delivery device.

The automotive field, in particular, uses exhaust-gas treatment devices to which a fluid is supplied for the purification of the exhaust gases. An exhaust-gas purification method particularly widely used in such exhaust-gas treatment devices is the process of selective catalytic reduction [SCR process]. In that process, reducing agent is added to the exhaust gas in order to reduce nitrogen oxide compounds in the exhaust gas. Ammonia is generally used as the reducing agent. Ammonia is normally not stored in motor vehicles directly but rather in the form of a precursor solution which can be converted to form ammonia in the exhaust-gas treatment device or in an additional reactor provided for that purpose. A particularly widely used reducing agent precursor solution is aqueous urea solution. A 32.5% urea-water solution available under the trademark AdBlue® is particularly widely used. For simplicity, the expressions "reducing agent" and "reducing agent precursor solution" will hereinafter be used synonymously for one another.

In constructing delivery devices for the delivery of (aqueous) reducing agent, it must be taken into consideration that the reducing agent can freeze at low temperatures. The reducing agent AdBlue®, for example, freezes at temperatures of −11° C. Such temperatures may arise, for example, during long standstill phases of motor vehicles. An aqueous reducing agent expands when it freezes. A delivery device must therefore be constructed in such a way that it is not damaged by the expansion of freezing reducing agent or by the associated pressure increase.

It is desirable for the delivery duct of the delivery device through which reducing agent is delivered to be substantially rigid for high dosing accuracy of a delivery device. In particular, if a dosing pump is used for the combined delivery and dosing of the reducing agent, a rigid delivery duct is used in order to ensure as small as possible a change in the volume of the delivery duct. It is only in that way that it can be ensured that the amount of reducing agent delivered by the dosing pump into the delivery duct corresponds precisely to the amount exiting the delivery duct.

In that case, there is accordingly a technical conflict with regard to the requirements for freezing resistance and duct stiffness, and it has heretofore not been possible to fully satisfactorily resolve the conflict, in particular in conjunction with high operational accuracy in dosing pumps.

SUMMARY OF THE INVENTION

It is accordingly an object of the invention to provide a delivery device with protection against freezing, methods for operating and deactivating a delivery device and a motor vehicle having a delivery device, which overcome the hereinafore-mentioned disadvantages and solve or alleviate the highlighted technical problems of the heretofore-known devices, methods and vehicles of this general type. It is sought, in particular, to disclose an especially advantageous delivery device for delivering reducing agent and particularly advantageous methods for operating a delivery device of that type. In this case, the delivery devices should, in particular, permit precise dosing, protect pressure-sensitive components during the freezing process, realize a compact construction, be inexpensive to produce and/or permit at least an active/passive adaptation of the shape of a section of the delivery duct. The methods should (additionally) be suitable, in particular, for positively influencing the freezing behavior of the delivery device, preferably in such a way that the risk of undesirably high pressures close to pressure-sensitive components as a result of the formation of ice in the delivery duct can be locally reduced, or even prevented, in a targeted fashion.

With the foregoing and other objects in view there is provided, in accordance with the invention, a delivery device for delivering reducing agent into an exhaust-gas treatment device, comprising at least one delivery duct with at least one flexible or elastic wall region which can deform when reducing agent in the delivery duct freezes, the flexible or elastic wall region separating the delivery duct from a compressed-air chamber which is connected to a compressed-air source.

A delivery device generally has at least one pump through which reducing agent can be delivered through the delivery duct. In delivery devices for reducing agent, it is preferable for two different types of pump to be alternatively used, wherein the type of pump has a significant influence on the mode of operation of the delivery device.

The first pump type is dosing pumps. In the case of a dosing pump, the amount of reducing agent delivered by the pump can be precisely determined. The control of the amount of reducing agent supplied to the exhaust-gas treatment device can therefore be realized (for example at least partially/temporarily solely) by using a dosing pump. Dosing pumps are distinguished in that the delivery movement, performed by the pump, of a movable pump element is precisely defined, in such a way that the delivered amount of reducing agent can be inferred from the delivery movement. The delivery movement may, for example, be monitored by using special sensors on the movable pump element and/or on the drive of the movable pump element. Dosing pumps are often constructed as piston pumps which are driven by a rotary drive through an eccentric.

The second pump type is pure delivery pumps. With such delivery pumps, the delivered amount of reducing agent itself cannot be monitored on the basis of the pump operation alone. This is not possible, for example, because it is not possible to monitor the movement of a movable pump element for structural reasons, and/or because no sensors for monitoring the movement are provided, and/or because there is a leakage flow (counter to the delivery direction) through the pump, which leakage flow influences the amount delivered. If a pure delivery pump is used in a delivery device, it is accordingly necessary for an additional control device for regulating the precise metered amount to be provided for the dosing. Typically, a pure delivery pump is regulated so as to build up in each case a defined pressure of the reducing agent in a line section and/or in a separate pressure accumulator volume. The dosing then generally takes place from the pressurized reducing agent volume by using an injector. For a fixed pressure, the dosed amount is, for example, approximately proportional to the opening time of the injector.

The pump is disposed preferably upstream of the elastic wall region in the delivery direction along the delivery duct. In other words, this means, in particular, that the conventional operating pressure, that is to say, for example, a pressure of 2 to 8 bar, acts in the region of the elastic wall region during operation. Even though it is basically possible and may be expedient for a plurality of flexible wall sections to be provided in the delivery duct, for example in a section between a pump and an injector, a single elastic wall region may suffice if appropriate. The elastic wall section is disposed, in particular, in the vicinity of a pressure-sensitive section of the delivery duct in which, in particular, pressures considerably higher than the operating pressure (for example during the freezing of reducing agent) should be avoided. Such a section may have, for example, a seal, a port, a sensor, a valve, etc.

The elastic wall region is, in particular, constructed in such a way that it can perform a reversible deformation (compensating movement) in the case of an excess pressure (in the duct/in the compressed-air chamber) in order to realize an enlargement of the volume of the adjacent chamber with the excess pressure. The elasticity or flexibility should, in particular, be adapted to the usage (type of reducing agent; type of delivery duct; temperature range during operation; shut-down situation and/or freezing situation; pressure range during operation, shut-down situation and/or freezing situation).

The elastic wall region may cover an encircling and/or lateral sectional region of the delivery duct. It is preferable for the sectional region to cover, at a maximum, an area ($Aa$, max) of the delivery duct which amounts to at most 5 cm [centimeters] of a length ($Lk$) of the delivery duct multiplied by a circumference ($Uk$) of the delivery duct ($Aa$, max=5 cm×$Uk$). The elastic wall region very particularly preferably covers a sectional region with an area of at least 50 mm$^2$ [square millimeters] to 5000 mm$^2$, preferably 100 mm$^2$ to 500 mm$^2$, wherein this applies, in particular, for the situation in which the elastic wall region is positioned in the direct vicinity of a sensor.

The elastic wall region may furthermore be formed in one piece or in multiple pieces. It is preferable for the elastic wall region to form a continuation of the profile of the delivery duct, that is to say, in particular, to be at least partially curved and/or to form a curved channel which receives or adjoins as precisely as possible the adjacent duct wall. The elastic wall region preferably does not have a substantially planar shape but rather forms, for example, a coil of the delivery duct, and/or surrounds the delivery duct. It is also preferable for at least a central region of the elastic wall region to be mechanically unsupported, that is to say, in particular, no additional spring elements, props, etc. are provided which prevent a free elastic deformation of the central region. The central region can therefore deform preferably substantially (only) as a function of the inherent material properties of the elastic wall region and of the presently acting fluid pressures at both sides. The central region of the elastic wall region may be provided in a lateral and/or end-side region. The elastic wall region preferably has regions of different elasticity, that is to say at least a first region which can elastically deform already at a first pressure and a second region which can elastically deform at a second pressure, wherein the second pressure is higher than the first pressure, in particular at least by a factor of 2, preferably at least by a factor of 4 and very particularly preferably at least by a factor of 10. In this way, it is possible to achieve a targeted elastic deformation at different pressures, wherein as small as possible a change in volume of the delivery duct is obtained, which for example also promotes the precise dosing and control of the reducing agent metering and/or the endurance limit (operation in low-pressure range, operation in high-pressure range, freezing situation).

An air pressure can be built up in the compressed-air chamber by the compressed-air source during the operation of the delivery device. The air pressure is preferably (slightly) higher than a reducing agent pressure (presently) prevailing in the delivery duct, which reducing agent pressure is built up by the pump. In particular, the air pressure is substantially constant and lies preferably in the upper range of the maximum operating range of the delivery unit (for example at least 80% of the maximum delivery pressure, in particular at least 100% of the maximum delivery pressure or particularly preferably at least 120% of the maximum delivery pressure, wherein it is furthermore preferable for the air pressure not to exceed 200% of the maximum delivery pressure). If the air pressure is still below the maximum delivery pressure, it is possible to obtain damping of (individual) pressure peaks in the reducing agent resulting, for example, from the operation of the pump. The flexible wall region is preferably constructed so as to behave substantially rigidly when preloaded by the air pressure in the compressed-air chamber. It can thus be ensured that the delivery duct for the reducing agent disposed in the delivery duct is substantially rigid for as long as the air pressure in the compressed-air chamber is maintained. In order to permit an increase in a volume of the delivery duct, for example if reducing agent in the delivery duct freezes, the air pressure in the compressed-air chamber can be dissipated in the freezing situation. This takes place, for example, automatically when the delivery device is deactivated and therefore the compressed-air source also no longer provides compressed air.

The compressed-air chamber preferably has a compressed-air chamber volume which amounts to at least 50 mm$^3$ [cubic millimeters], in particular lies in the range from 100 mm$^3$ to 3000 mm$^3$, and preferably does not exceed 5000 mm$^3$. It is preferable for the compressed-air chamber to be delimited predominantly by the flexible wall region. It is very particularly preferable for the compressed-air chamber to be formed with a cavity which is at least partially delimited by the flexible wall region and which is formed with a port to a compressed-air duct (for example in the manner of a line opening), wherein if appropriate no other components directly delimit the compressed-air chamber. The compressed-air source may be provided separately for the compressed-air chamber and/or may also supply compressed air to other components, wherein it is preferable for the compressed-air source to be controllable or regulable in order to adjust the pressure in the compressed-air chamber.

According to the present invention, it is possible in a particularly advantageous manner to realize a delivery device which can be of substantially rigid construction in the delivery duct during operation, whereas it (automatically) behaves elastically and can be very easily deformed in the deactivated state. Sufficient space is thus available for the freezing reducing agent in the freezing situation. The invention is used, in particular, in the technical field specified in the introduction, so that reference may also be made thereto for explanation.

In accordance with another feature of the delivery device of the invention, it is advantageous if a stop for the flexible wall region is provided in the delivery duct, and the flexible wall region can be preloaded against the stop by the compressed air from the compressed-air chamber.

In this case, the construction of the flexible wall region may, in particular, be of two different types (at different times or at different pressures in the pressure chamber and/or in the delivery duct) in order to behave substantially rigidly during operation. According to the first type, the flexible wall region is constructed to be flexible but not elastically deformable. If an air pressure acts in the compressed-air chamber outside the delivery duct, the flexible wall region is stressed and has imparted to it a (substantially) invariant shape for as long as the air pressure in the compressed-air chamber is higher than the reducing agent pressure in the delivery duct. According to the second type, the flexible wall region is constructed to be not only flexible but also elastically deformable. The actual shape and position of a flexible wall region of this type is dependent in each case on the prevailing pressure difference between the compressed-air chamber and the pressure in the delivery duct. Substantially rigid behavior can be realized if the flexible elastic wall region is preloaded by the compressed air against a stop. Then, for as long as the pressure difference does not fall below a threshold value, the flexible elastic wall region bears against the stop and behaves substantially rigidly. The stop is provided preferably outside the pressure chamber, for example on the delivery duct and/or on a housing for the pressure chamber or the delivery duct and/or on a casing of another system component (such as, for example, a sensor, base plate, etc.). The stop may, in particular, be part of the delivery duct or the wall thereof, wherein if appropriate a contact surface or contact contour (in the form of a line) may be provided which is adapted to the construction of the flexible wall region.

In accordance with a further feature of the delivery device of the invention, it is also advantageous if the flexible wall region is an elastic sleeve which is disposed in a section of the delivery duct.

An elastic sleeve may, for example, be a cylindrically shaped sleeve composed of rubber or a similar material which is, in particular, durable and impermeable to the reducing agent being used. The wall thickness of the sleeve may vary over the length of the sleeve. The sleeve is preferably reinforced in regions by a reinforcement sleeve (in particular from the inside that is to say from the pressure chamber). The delivery duct may be disposed in a base plate of the delivery device. The delivery duct is, for example, cast or drilled in the base plate. The section (which is preferably cylindrical at least in sections) in which the elastic sleeve is disposed or through which the elastic sleeve at least partially extends may, for example, be a bore or a recess which intersects the rest of the delivery duct and which thus forms the delivery duct together with the rest of the delivery duct. The elastic sleeve may bear (partially) against the wall of the cylindrical section of the delivery duct. The wall of the cylindrical section then forms a type of stop for the elastic sleeve, wherein the elastic sleeve can be preloaded by the compressed air in the compressed-air chamber against the stop or against the wall of the cylindrical section.

In accordance with an added feature of the delivery device of the invention, it is also advantageous if the delivery duct is connected to a pressure sensor and the flexible wall region is disposed at a distance of less than 2 cm [centimeters] from the pressure sensor. The distance is particularly preferably less than 1 cm [centimeter] and more preferably at least 0.1 cm.

The pressure sensor is typically that part of a delivery device which reacts most sensitively to ice pressure which arises and which can be damaged by ice pressure which arises or by freezing of the reducing agent. The pressure sensor is normally not capable of withstanding pressure increases which go far beyond the normal operating pressures of the delivery device (between 2 and 8 bar). The pressure sensor is normally very deliberately constructed to function only in the range of the normal operating pressures, because otherwise the resolution accuracy of the pressure sensor would fall. A pressure sensor suitable for this application cannot withstand, for example, an ice pressure which may be many times higher than 30 or even higher than 50 bar. For this reason, it has proven to be particularly advantageous for the flexible wall region, which permits particularly effective ice pressure compensation, to be disposed in the direct vicinity of a pressure sensor in the delivery device.

In accordance with an additional feature of the delivery device of the invention, it is advantageous if the flexible wall region extends into a measurement volume of the pressure sensor. Pressure sensors typically have a measurement volume or a measurement chamber, wherein the pressure sensors are then set up to measure the pressure within the measurement volume or within the measurement chamber. A measurement volume or a measurement chamber is preferably open at one side in order to be connected to a fluid line in which the medium having a pressure which is to be measured is situated. It is particularly advantageous for the flexible wall region to be formed so as to partially fill the measurement volume of the pressure sensor during operation of the delivery device. It is thus possible to prevent too large an amount of reducing agent from being present in the measurement volume, which may damage the measurement volume, or the pressure sensor surrounding the measurement volume, in the freezing situation. Such a configuration of the flexible wall region can particularly advantageously be obtained if the flexible wall region is formed as an elastic sleeve. The elastic sleeve may then extend into the measurement volume through an opening of the measurement volume. The measurement volume is then preferably disposed as an elongation of a cylindrical section of the delivery duct in which the elastic sleeve is situated.

In accordance with yet another feature of the delivery device of the invention, it is advantageous if a mixing chamber is provided for mixing the reducing agent with compressed air, wherein the compressed-air chamber and the mixing chamber utilize a common compressed-air source. The mixing chamber need not be a constituent part of the delivery device but rather may also be disposed, adjoining the delivery duct, downstream of the delivery device. Mixing reducing agent with compressed air in a mixing chamber is advantageous for obtaining a best possible injection of the reducing agent into an exhaust-gas treatment device. Reducing agent mixed through with compressed air can be sprayed in a particularly advantageous manner into an exhaust-gas treatment device, in such a way that particularly small spray droplets are formed. In this way, a particularly effective evaporation of the reducing agent can be obtained in the exhaust-gas treatment device. This in turn permits a particularly efficient conversion and utilization of the reducing agent in the exhaust-gas treatment device. In the case of delivery devices which have a mixing chamber for mixing reducing agent and compressed air, a compressed-air source is already required due to the construction. Therefore, a compressed-air source is already provided and the special features of the delivery device described herein can be implemented in a particularly simple manner.

The invention also claims various methods. The advantages and structural features explained with regard to the delivery device can be transferred and applied analogously to the methods according to the invention. The same applies to the special advantages and structural features of the methods explained below, which can be applied and transferred to the delivery device.

With the objects of the invention in view, there is also provided a method for operating any desired structural variant of the delivery device described herein according to the invention, comprising at least the following steps:

a) maintaining an air pressure of between a first air pressure threshold and a second air pressure threshold in the compressed-air chamber, b) delivering and dosing reducing agent through the delivery duct into an exhaust-gas treatment device, wherein an average reducing agent pressure between a first reducing agent pressure threshold and a second reducing agent pressure threshold is maintained in the delivery duct, whereby the first reducing agent pressure threshold is smaller than the first air pressure threshold and the second reducing agent pressure threshold is smaller than the second air pressure threshold, and c) compensating a pressure peak of the reducing agent pressure by using a deformation of the flexible wall region if the pressure peak is higher than the air pressure (18) in the compressed-air chamber.

Preferably, the first air pressure threshold is about 3.4 bar and the second air pressure threshold is about 4.6 bar. Preferably, the first reducing agent pressure threshold is about 3.0 bar and the second reducing agent pressure threshold is about 4.4 bar. Preferably, the margin of fluctuation of the air pressure is readily higher than the margin of fluctuation of the reducing agent pressure. However, it is not necessary that the air pressure is generally higher than the reducing agent pressure.

The compressed-air chamber is preferably connected directly to the compressed-air source, wherein the compressed-air source, after its activation, generates and/or maintains the air pressure according to step a) on demand and/or permanently. The air pressure prevailing in the compressed-air chamber therefore preferably corresponds to the pressure provided by the compressed-air source. The pressure may exhibit a certain degree of fluctuation because the compressed-air source generally provides compressed air to different compressed-air consumers, and the air pressure provided by the compressed-air source is generally dependent on the amount of compressed air demanded. Further compressed-air consumers connected to the compressed-air source may, for example, be a mixing chamber for mixing reducing agent and compressed air, a brake system, or an internal combustion engine itself. It may be the case that an internal combustion engine is a compressed-air consumer of the compressed-air source, in particular, if the internal combustion engine has a turbocharger which is simultaneously utilized as a compressed-air source for the described delivery device.

The average reducing agent pressure maintained in the delivery duct according to step b) preferably lies between 3.5 bar and 4.1 bar, and is particularly preferably approximately 3.8 bar. This is, in particular, an arithmetic mean value of a measured reducing agent pressure over a unitary time period (for example one minute) during operation.

The pressure of the reducing agent in the delivery duct may, however, fluctuate. In particular, if a dosing pump is used for delivering the reducing agent, through the use of which dosing pump the amount of reducing agent delivered through the delivery duct and the amount of reducing agent injected into the exhaust-gas treatment device is dosed, it is harmless if (minor) fluctuations of the reducing agent pressure in the delivery duct occur. The delivered amount is already pre-defined by the dosing pump, and the pressure fluctuations have no significant effect on the dosing accuracy. Nevertheless, strong fluctuations of the pressure can have a cross interference on the dosing accuracy of a dosing pump. Because of this reason the reducing agent pressure should be controlled in such a manner that very strong fluctuations of pressure do not occur. In contrast, if reducing agent is delivered by using a delivery pump, it is more important to precisely maintain as accurate a reducing agent pressure as possible, because in the case of a delivery pump, the precise dosing of reducing agent into the exhaust-gas treatment device generally takes place by using an injector, and the amount of reducing agent supplied through the injector of the exhaust-gas treatment device is generally highly dependent on the reducing agent pressure. Due to the delivery movement of the pump, it is often possible for "short-term" pressure peaks to arise in the delivery duct. Such short-term pressure peaks may be detrimental to the delivery device, to an injection device and/or also to a pressure sensor provided in the delivery device. It is therefore advantageous for such short-term pressure peaks to be compensated or attenuated by a deformation of the flexible wall region. Such compensation takes place, in particular, when the pressure peak has a higher peak pressure than the air pressure prevailing in the compressed-air chamber. The flexible wall section then deforms, in such a way that the volume of the delivery duct is changed and the pressure in the delivery duct immediately falls. A compensation of pressure peaks by using the flexible wall section is possible regardless of whether the flexible wall section is elastic or not elastic. It is self-evidently also possible in this way for pressure peaks which form during the freezing process, such as massive ice pressures, to be considerably reduced or eliminated (at least in this region).

With the objects of the invention in view, there is furthermore provided a method for deactivating any desired structural variant of the delivery device described herein according to the invention, comprising at least the following steps:

w) ending a delivery of reducing agent through the delivery duct by using a pump, x) dissipating a reducing agent pressure in the delivery duct, y) temporarily maintaining an air pressure of between 3.4 bar and 4.6 bar in the compressed-air chamber, and z) dissipating the air pressure in the compressed-air chamber.

The pump may be a delivery pump or a dosing pump. The described method is distinguished, in particular, in that step x) takes place before step z) in terms of time, wherein an air pressure in the compressed-air chamber within the context of step y) is temporarily maintained between step x) and step z). In this way, it is possible to prevent the flexible wall section from prematurely deforming in such a way that a follow-up flow of liquid reducing agent into the delivery duct can take place, and the amount of reducing agent present in the delivery duct thus being further increased during the deactivation of the delivery device. In the case of a flexible and elastic wall section, it is if appropriate even possible in step y) for the wall section to even expand, and thus force additional reducing agent out of the delivery duct, due to the falling reducing agent pressure and due to the rising pressure difference between the delivery duct and the compressed-air chamber. It is thus possible for the amount of reducing agent in the delivery duct to be further reduced, and the risk of damage to the delivery duct as a result of freezing reducing agent to be likewise reduced.

In accordance with another mode of the method of the invention, it is particularly advantageous if, before step z), the delivery duct is closed in such a way that no follow-up flow of reducing agent into the delivery duct can take place.

The closure of the delivery duct may be realized, for example, in that a pump for delivering the reducing agent into the delivery duct cannot be passed through by reducing agent when the pump is in the deactivated state. A pump often has provided in it valves which are closed in the shut-down situation and which thus ensure that reducing agent cannot pass through the pump. It is also possible for an additional valve to be provided which closes off the delivery duct and prevents reducing agent from being sucked out. A further possibility is that a plug of frozen reducing agent is formed during the freezing of reducing agent in the delivery duct at a specifically predefined point (for example a heat sink) which blocks the delivery duct.

In the case of a delivery device for reducing agent which includes a mixing chamber for mixing of reducing agent and compressed-air, the conveyance of compressed-air is preferably maintained for a further period of time after the ending of the conveyance of reducing agent for carrying the reducing agent out from the mixing chamber, and/or out from the delivery duct by using the compressed-air. In this manner deposits of reducing agent in the mixing chamber can be avoided. Consequently, in the case of such operation of a delivery device the air pressure is already maintained longer than the reducing agent pressure. Accordingly, the inventive method for deactivating a delivery device can be realized with little effort for a delivery device which is created and constructed in the described manner if the same compressed air source is utilized for the mixing chamber and for the compressed-air chamber.

With the objects of the invention in view, there is concomitantly provided a motor vehicle comprising an internal combustion engine, an exhaust-gas treatment device for the purification of the exhaust gases of the internal combustion engine, and a delivery device according to the invention for delivering reducing agent into the exhaust-gas treatment device. With the delivery device of the motor vehicle, it is preferably also possible for the method according to the invention for operating a delivery device and the method according to the invention for deactivating a delivery device to be carried out. For this purpose, the motor vehicle preferably has a control unit which is set up for carrying out at least one of the specified methods.

Other features which are considered as characteristic for the invention are set forth in the appended claims, noting that the features specified individually in the claims may be combined with one another in any desired technologically meaningful way and may be supplemented by explanatory facts from the description, in which further structural variants of the invention are specified.

Although the invention is illustrated and described herein as embodied in a delivery device with protection against freezing, methods for operating and deactivating a delivery device and a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
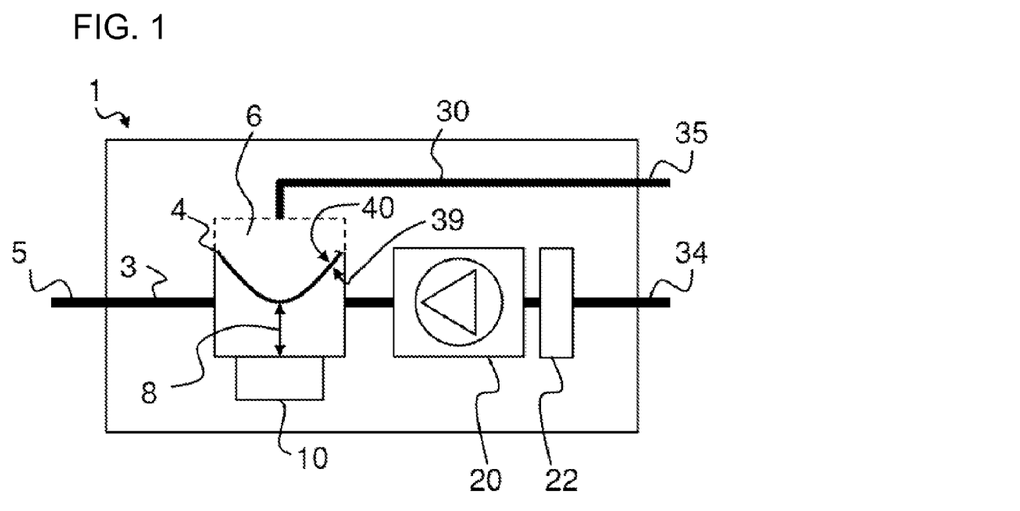
FIG. 1 is a schematic and block diagram of a first structural variant of a delivery device.
Figure 2:
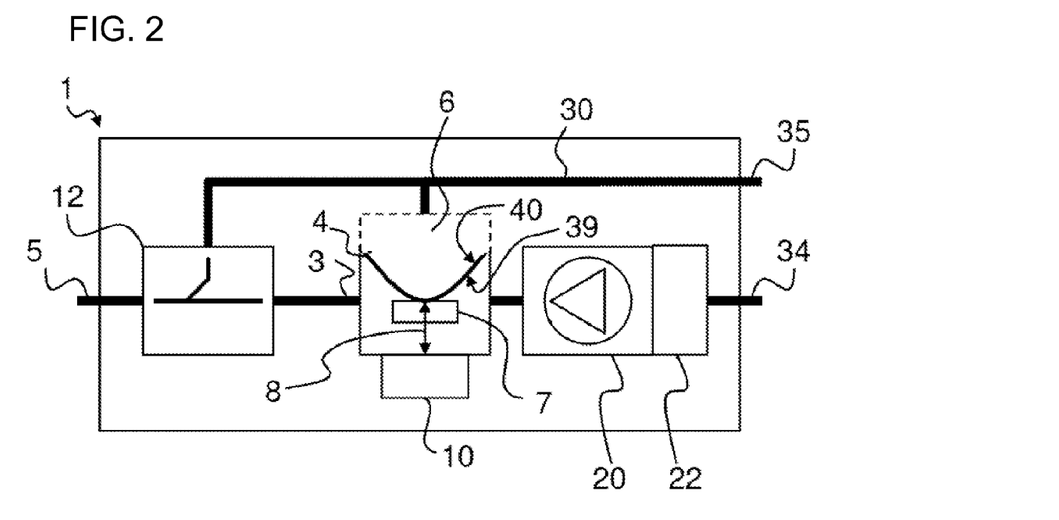
FIG. 2 is a schematic and block diagram of a second structural variant of a delivery device.
Figure 3:
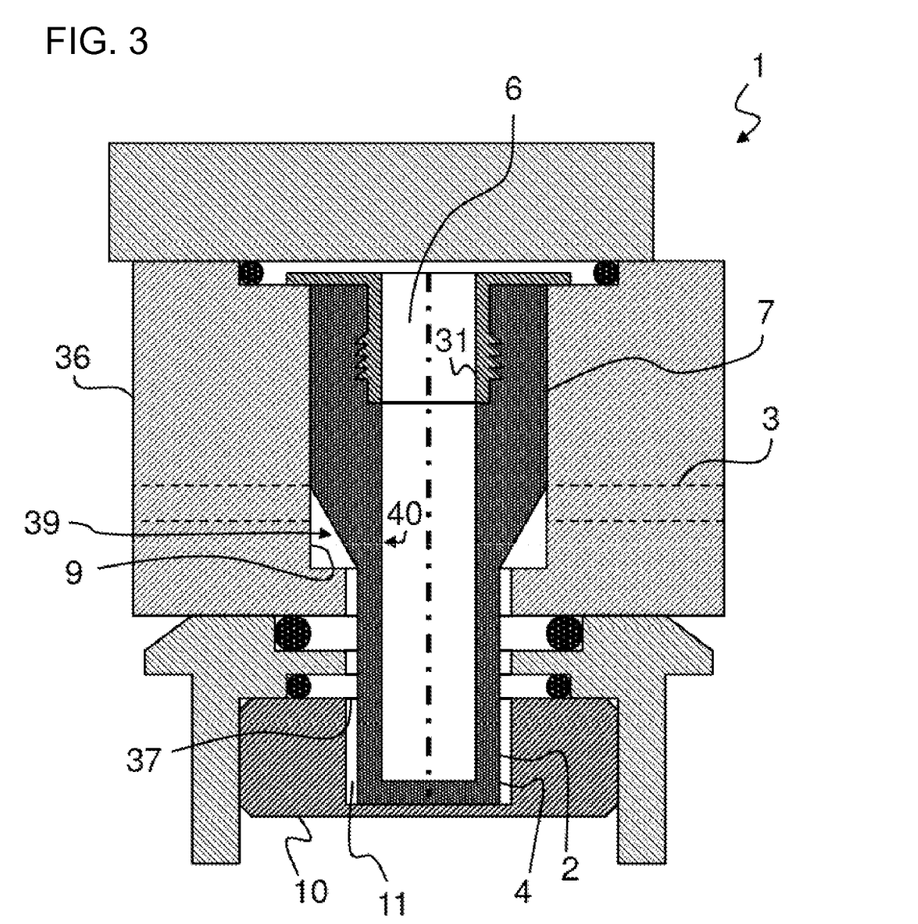
FIG. 3 is a diagrammatic, vertical-sectional view of a delivery device.

Referring now in detail to the figures of the drawing in which proportions are merely diagrammatically illustrated for explaining the invention and the technical field in more detail by showing particularly preferred structural variants to which the invention is not restricted, and first, particularly, to FIGS. 1, 2 and 3 thereof, there are seen three different structural variants of a delivery device 1, in which possible combinations of features of the delivery device 1 are realized in each case. The combinations of features illustrated in FIGS. 1, 2 and 3 are not exhaustive. The different features illustrated in FIGS. 1, 2 and 3 may be combined with one another, and with further features from the entire content of the disclosure, in any desired technologically meaningful way.

The delivery device 1 shown in each of FIGS. 1 and 2 has a delivery duct 3 into which reducing agent can be delivered by using a pump 20. One region of the delivery duct 3 has a flexible wall region 4 with an inner side 39 which delimits the delivery duct 3 and with an outer side 40 which adjoins a compressed-air chamber 6. The delivery duct 3 extends in each case from a suction port 34 to an injector port 5. A reducing agent tank can be connected to the suction port 34. An injection device for injecting and/or spraying the reducing agent into an exhaust-gas treatment device can be connected to the injector port 5. The compressed-air chamber 6 is supplied with compressed air through a compressed-air duct 30. The compressed-air duct 30 has a compressed-air port 35 for the connection of a compressed-air source. The delivery duct 3 can be closed off by a closure device 22, in such a way that no follow-up flow of reducing agent from the suction port 34 into the delivery duct 3 can take place. The closure device 22 may, on one hand, be constructed as a constituent part of the pump 20. This variant is illustrated in FIG. 2. In this case, the closure device 22 is, for example, at the same time a valve of the pump 20. The closure device 22 may also be formed as a separate component. This is illustrated in FIG. 1. In this case, the closure device 22 may, for example, be a valve which can be actuated separately. A pressure sensor 10 is disposed in the direct vicinity of the flexible wall region 4, at a distance 8 from the flexible wall region 4. The distance 8 is preferably 2 cm [centimeters] or less. In the structural variant of FIG. 2, as an additional feature, a stop 7 is provided against which the flexible wall region 4 is preloaded. In this structural variant, the flexible wall region 4 may also be elastic. As a further special feature, the structural variant according to FIG. 2 has a mixing chamber 12 in which compressed air and reducing agent can be mixed with one another. The mixing chamber 12 is preferably also connected to the compressed-air duct 30 which also supplies compressed air to the compressed-air chamber 6. The mixing chamber 12 may then also be supplied with compressed air from a compressed-air source through the compressed-air port 35.

FIG. 3 shows a section through a delivery device 1. The delivery device 1 has a base plate 36 which bears the important components of the delivery device 1. The delivery duct 3 is provided in the base plate 36, preferably as a cast or drilled free space. The flexible wall region 4 is formed by an elastic sleeve 2 which is inserted into a cylindrical section 9 of the delivery duct 3. The cylindrical section 9 is also formed in the base plate 36 as a cast free space or as a bore. The cylindrical section 9 intersects the rest of the delivery duct 3. A pressure sensor 10 is disposed opposite the cylindrical section 9 of the delivery duct 3. The pressure sensor 10 has a measurement volume 11 with an opening 37. The pressure sensor 10 is connected through the opening 37 to the delivery duct 3 so that the pressure arising in the delivery duct 3 can enter into the measurement volume 11 of the pressure sensor 10. The elastic sleeve 2 extends preferably through the cylindrical section 9 and through the opening 37 into the measurement volume 11. The flexible wall region 4 has an inner side 39 which faces towards the delivery duct 3 and is, in effect, an outer side of the elastic sleeve 2. The flexible wall region 4 has an outer side 40 which faces towards the compressed-air chamber 6 and is, in effect, an inner side of the elastic sleeve 2. The inner region of the elastic sleeve 2 is preferably a constituent part of the compressed-air chamber 6. The elastic sleeve 2 is preferably provided, in regions, with a reinforcement sleeve 31 through which particularly fluid-tight mounting of the elastic sleeve 2 in the cylindrical section 9 of the delivery duct 3 is also made possible. Through the use of the reinforcement sleeve 31 on that end of the elastic sleeve 2 which is connected to the compressed-air chamber 6, it is possible to ensure that the elastic sleeve 2 does not deform there and can be connected to the compressed-air chamber 6 in a particularly air-tight manner. The elastic sleeve 2 is preferably rotationally symmetrical. The delivery duct 3 is continued through the cylindrical section 9 annularly around the elastic sleeve 2, in such a way that a continuous flow path past the elastic sleeve 2 is formed by the delivery duct 3.

Figure 4:
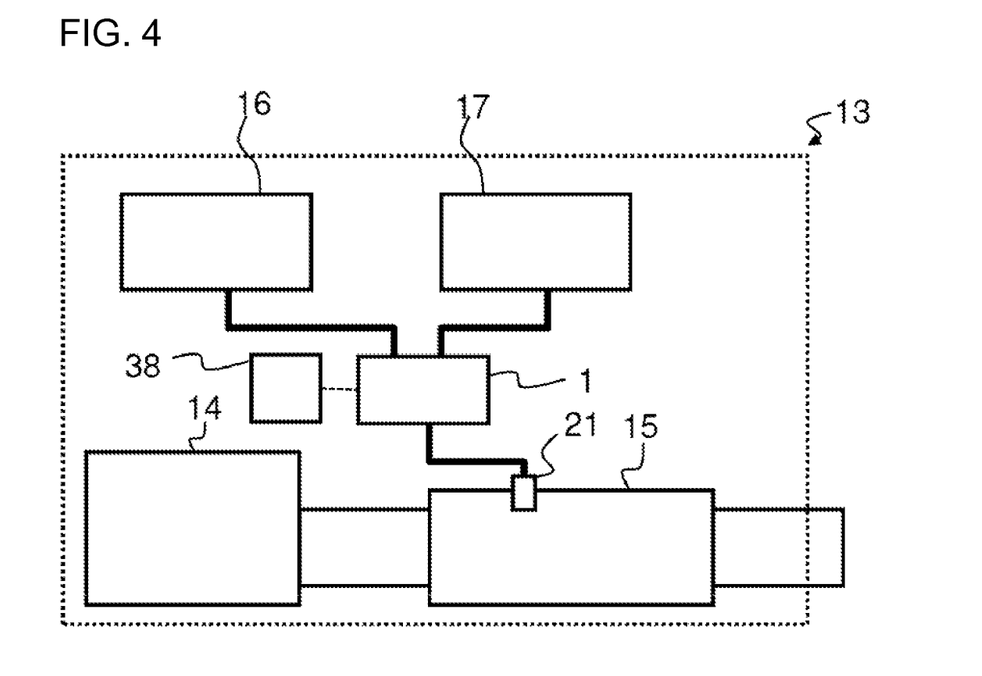
FIG. 4 is a block diagram of a motor vehicle having a delivery device.

FIG. 4 shows a motor vehicle 13 having an internal combustion engine 14 and an exhaust-gas treatment device 15 for the purification of exhaust gases of the internal combustion engine 14. A reducing agent can be injected into the exhaust-gas treatment device 15 by using an injection device 21. The injection device 21 is supplied with reducing agent by a delivery device 1. The delivery device 1 is in turn supplied with compressed air by a compressed-air source 16. The delivery device 1 extracts reducing agent from a reducing agent tank 17. In order to carry out the various methods described, the motor vehicle 13 has a control unit, controller or computer 38 in which the described methods may be stored and which is connected to the delivery device 1. The control unit 38 may be the engine controller of the motor vehicle 13 or a constituent part of the engine controller of the motor vehicle 13.

Figure 5:
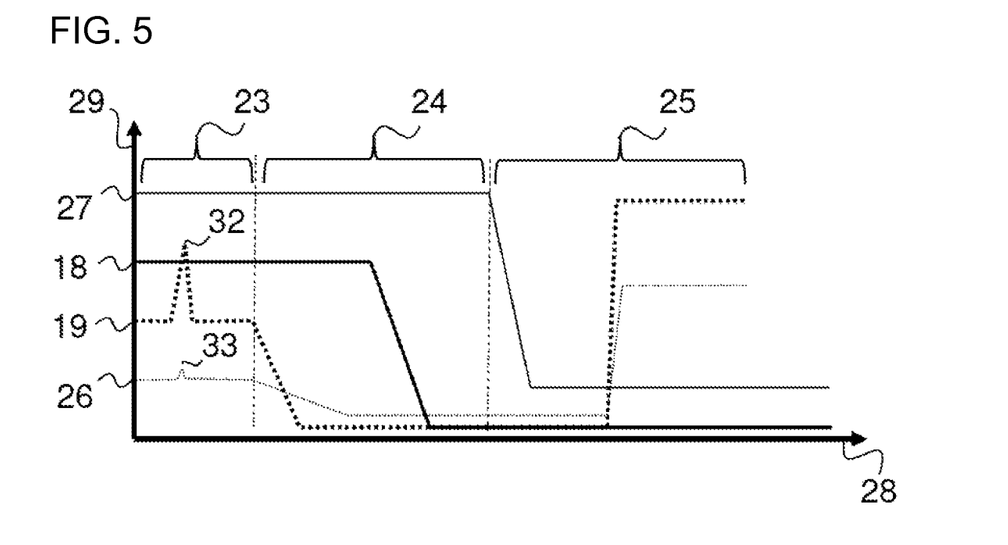
FIG. 5 is a diagram illustrating the operation of a delivery device.

FIG. 5 shows a diagram illustrating different operating phases of a delivery device. Plotted on a vertical axis 29 versus a time axis 28 are in each case an air pressure 18 in the compressed-air chamber, a reducing agent pressure 19 in the delivery duct, a temperature 27 in the region of the delivery device, and a device volume 26 of the delivery duct of the delivery device. The diagram illustrates firstly an operating phase 23. The operating phase 23 is distinguished in that the air pressure 18 is normally higher than the reducing agent pressure 19. A pressure peak 32 is, however, illustrated. If the pressure peak 32 is higher than the air pressure 18, this is realized by a deformation 33 of the flexible wall region, as a result of which the device volume 26 briefly increases.

A shut-down phase 24 of the delivery device is also illustrated. The shut-down phase 24 is distinguished in that the compressed air 18 is maintained for longer than the reducing agent pressure 19. In this way, no additional reducing agent is sucked into the delivery device during the shut-down phase 24. In the simplest case, the device volume 26 remains constant. With a suitable construction of the delivery device, it is even possible for the device volume 26 to decrease slightly during the shut-down phase 24, because the flexible wall section expands slightly into the delivery duct 3. The amount of reducing agent present in the delivery device is then even reduced. This situation is illustrated therein.

A freezing phase 25 is also illustrated in the diagram. The freezing phase 25 is distinguished firstly in that the temperature 27 falls sharply. The temperature must, in particular, be below the freezing temperature of the reducing agent. After the fall in temperature 27, nothing happens initially because the delivery device must firstly cool all the way through. The reducing agent freezes when the delivery device has cooled all the way through. As a result, the device volume 26 is enlarged. The reducing agent pressure 19 simultaneously also rises. As a result of the construction of the flexible wall region, however, the reducing agent pressure is prevented from rising to such an extent that the delivery device and, in particular, a pressure sensor provided in the delivery device, is damaged.

The structural variants of the delivery devices proposed herein permit precise dosing, in such a way that pressure-sensitive components are particularly well protected during the freezing process and/or during operation. They have a compact construction and are also inexpensive to produce. Furthermore, they permit at least an active/passive adaptation of the shape of a section of the delivery duct. The methods are furthermore suitable for positively influencing the freezing behavior of the delivery device, in particular in such a way that the risk of undesirably high pressures close to pressure-sensitive components as a result of the formation of ice in the delivery duct can be locally reduced, or even eliminated, in a targeted fashion.

The invention claimed is:

1. A delivery device for delivering reducing agent into an exhaust-gas treatment device, the delivery device comprising:
    a compressed-air chamber connected to a compressed-air source; and
    at least one delivery duct extending from a suction port to an injection port and having at least one flexible wall region configured to deform when reducing agent in said at least one delivery duct freezes;
    said at least one flexible wall region separating said at least one delivery duct from said compressed-air chamber, and said at least one flexible wall region having at least a central region being mechanically unsupported to permit a free elastic deformation of said central region due to fluid pressures acting at both sides of said at least one flexible wall region.

2. The delivery device according to claim 1, which further comprises a stop disposed in said at least one delivery duct for stopping said at least one flexible wall region, said at least one flexible wall region configured to be preloaded against said stop by compressed air from said compressed-air chamber.

3. The delivery device according to claim 1, wherein said at least one delivery duct has a section, and said at least one flexible wall region is an elastic sleeve disposed in said section.

4. The delivery device according to claim 1, which further comprises a pressure sensor connected to said at least one delivery duct, said at least one flexible wall region being disposed at a distance of less than 2 cm from said pressure sensor.

5. The delivery device according to claim 4, wherein said pressure sensor has a measurement volume, and said at least one flexible wall region extends into said measurement volume.

6. The delivery device according to claim 1, which further comprises a mixing chamber configured to mix the reducing agent with compressed air, said compressed-air chamber and said mixing chamber commonly using the compressed-air source.

7. A motor vehicle, comprising:
- an internal combustion engine;
- an exhaust-gas treatment device configured to purify exhaust gases of said internal combustion engine; and
- a delivery device according to claim 1 configured to deliver reducing agent into said exhaust-gas treatment device.

8. A method for operating a delivery device, the method comprising the following steps:
- providing a compressed-air chamber connected to a compressed-air source, providing at least one delivery duct extending from a suction port to an injection port and having at least one flexible wall region configured to deform when reducing agent in the at least one delivery duct freezes, separating the at least one delivery duct from the compressed-air chamber with the at least one flexible wall region, and providing the at least one flexible wall region with at least a central region being mechanically unsupported to permit a free elastic deformation of the central region due to fluid pressures acting at both sides of the at least one flexible wall region;
- a) maintaining an air pressure between a first air pressure threshold and a second air pressure threshold in the compressed-air chamber;
- b) delivering and dosing reducing agent through the at least one delivery duct into an exhaust-gas treatment device, maintaining an average reducing agent pressure between a first reducing agent threshold and a second reducing agent threshold in the at least one delivery duct, the first reducing agent pressure threshold being smaller than the first air pressure threshold and the second reducing agent pressure threshold being smaller than the second air pressure threshold; and
- c) compensating a pressure peak of the reducing agent pressure by deformation of the at least one flexible wall region if the pressure peak is higher than the air pressure in the compressed-air chamber.

9. A method for deactivating a delivery device, the method comprising the following steps:
- providing a compressed-air chamber connected to a compressed-air source, providing at least one delivery duct extending from a suction port to an injection port and having at least one flexible wall region configured to deform when reducing agent in the at least one delivery duct freezes, separating the at least one delivery duct from the compressed-air chamber with the at least one flexible wall region, and providing the at least one flexible wall region with at least a central region being mechanically unsupported to permit a free elastic deformation of the central region due to fluid pressures acting at both sides of the at least one flexible wall region;
- w) ending a delivery of reducing agent through the at least one delivery duct by using a pump;
- x) dissipating a reducing agent pressure in the at least one delivery duct;
- y) temporarily maintaining an air pressure of between 3.4 bar and 4.6 bar in the compressed-air chamber; and
- z) dissipating the air pressure in the compressed-air chamber.

10. The method according to claim 9, which further comprises closing the at least one delivery duct before step z) and preventing a follow-up flow of reducing agent into the at least one delivery duct from taking place.

* * * * *